United States Patent
Flanagan et al.

(10) Patent No.: US 7,840,717 B2
(45) Date of Patent: Nov. 23, 2010

(54) PROCESSING A VARIABLE LENGTH DEVICE COMMAND WORD AT A CONTROL UNIT IN AN I/O PROCESSING SYSTEM

(75) Inventors: John R. Flanagan, Poughkeepsie, NY (US); Daniel F. Casper, Poughkeepsie, NY (US); Catherine C. Huang, Poughkeepsie, NY (US); Matthew J. Kalos, Tucson, AZ (US); Ugochukwu C. Njoku, Yonkers, NY (US); Dale F. Riedy, Poughkeepsie, NY (US); Gustav E. Sittmann, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 12/030,939

(22) Filed: Feb. 14, 2008

(65) Prior Publication Data

US 2009/0210559 A1    Aug. 20, 2009

(51) Int. Cl.
*G06F 3/00* (2006.01)
(52) U.S. Cl. .............................. 710/5; 710/24; 710/62; 370/351; 714/720
(58) Field of Classification Search ................ 710/5, 710/20, 21, 24, 36, 45, 100, 107, 62
See application file for complete search history.

(56) References Cited

U.S. PATENT DOCUMENTS

| 3,943,283 A | 3/1976 | Caragliano et al. |
| 4,004,277 A | 1/1977 | Gavril |
| 4,374,415 A * | 2/1983 | Cormier et al. ............... 710/59 |
| 4,380,046 A | 4/1983 | Frosch et al. |

(Continued)

FOREIGN PATENT DOCUMENTS

DE    3931514    3/1990

(Continued)

OTHER PUBLICATIONS

Brice, et al.; U.S. Appl. No. 11/464,613; "Flexibility Controlling The Transfer Of Data Between Input/Output Devices And Memory"; filed Aug. 15, 2006; Specification having 23 pages and Drawings having 4 sheets.

(Continued)

*Primary Examiner*—Niketa I Patel
*Assistant Examiner*—Ernest Unelus
(74) *Attorney, Agent, or Firm*—Cantor Colburn LLP; John Campbell

(57) ABSTRACT

A computer program product, apparatus and method for processing a variable length device command word (DCW) at a control unit configured for communication with an input/output (I/O) subsystem in an I/O processing system. The computer program product includes a tangible storage medium readable by a processing circuit and storing instructions for execution by the processing circuit for performing a method. The method includes receiving a DCW at the control unit from the I/O subsystem. The DCW specifies one or more I/O operations and includes a command, a control data count, and control data having a varying length specified by the control data count. The control data is extracted in response to the control data count. The command is then executed in response to the extracted control data to perform the specified one or more I/O operations.

16 Claims, 12 Drawing Sheets

U.S. PATENT DOCUMENTS

| | | | |
|---|---|---|---|
| 4,455,605 A * | 6/1984 | Cormier et al. | 710/38 |
| 4,760,518 A | 7/1988 | Potash et al. | |
| 4,779,188 A | 10/1988 | Gum et al. | |
| 4,837,677 A | 6/1989 | Burrus, Jr. et al. | |
| 4,866,609 A | 9/1989 | Calta et al. | |
| 4,870,566 A | 9/1989 | Cooper et al. | |
| 5,016,160 A | 5/1991 | Lambeth et al. | |
| 5,031,091 A | 7/1991 | Wakatsuki et al. | |
| 5,040,108 A | 8/1991 | Kanazawa | |
| 5,386,512 A | 1/1995 | Crisman et al. | |
| 5,388,219 A | 2/1995 | Chan et al. | |
| 5,410,727 A | 4/1995 | Jaffe et al. | |
| 5,434,980 A * | 7/1995 | Casper et al. | 710/11 |
| 5,440,729 A | 8/1995 | Kimura et al. | |
| 5,461,721 A | 10/1995 | Cormier et al. | |
| 5,465,359 A | 11/1995 | Allen et al. | |
| 5,500,942 A | 3/1996 | Eickemeyer et al. | |
| 5,526,484 A | 6/1996 | Casper et al. | |
| 5,539,918 A * | 7/1996 | Allen et al. | 710/33 |
| 5,546,533 A | 8/1996 | Koyama | |
| 5,584,039 A * | 12/1996 | Johnson et al. | 710/6 |
| 5,600,793 A | 2/1997 | Nord | |
| 5,613,163 A | 3/1997 | Marron et al. | |
| 5,640,600 A * | 6/1997 | Satoh et al. | 710/33 |
| 5,758,190 A | 5/1998 | Johnson et al. | |
| 5,768,620 A | 6/1998 | Johnson et al. | |
| 5,831,985 A | 11/1998 | Sandorfi | |
| 5,860,022 A * | 1/1999 | Kondou et al. | 710/1 |
| 5,894,583 A | 4/1999 | Johnson et al. | |
| 5,901,327 A | 5/1999 | Ofek | |
| 6,230,218 B1 | 5/2001 | Casper et al. | |
| 6,343,335 B1 | 1/2002 | Dahman et al. | |
| 6,353,612 B1 | 3/2002 | Zhu et al. | |
| 6,484,217 B1 | 11/2002 | Fuente et al. | |
| 6,609,161 B1 | 8/2003 | Young | |
| 6,647,016 B1 | 11/2003 | Isoda et al. | |
| 6,651,125 B2 | 11/2003 | Maergner et al. | |
| 6,658,603 B1 | 12/2003 | Ward | |
| 6,693,880 B2 | 2/2004 | Gregg et al. | |
| 6,694,390 B1 | 2/2004 | Bogin et al. | |
| 6,772,207 B1 | 8/2004 | Dorn et al. | |
| 6,826,661 B2 | 11/2004 | Umbehocker et al. | |
| 6,862,322 B1 | 3/2005 | Ewen et al. | |
| 6,898,202 B2 * | 5/2005 | Gallagher et al. | 370/401 |
| 6,915,378 B2 | 7/2005 | Roberti | |
| 7,000,036 B2 | 2/2006 | Carlson et al. | |
| 7,003,700 B2 | 2/2006 | Elko et al. | |
| 7,020,810 B2 | 3/2006 | Holman | |
| 7,035,540 B2 | 4/2006 | Finan et al. | |
| 7,100,096 B2 | 8/2006 | Webb, Jr. et al. | |
| 7,111,130 B2 | 9/2006 | Blake et al. | |
| 7,124,207 B1 | 10/2006 | Lee et al. | |
| 7,202,801 B2 | 4/2007 | Chou | |
| 7,277,387 B2 | 10/2007 | Sanders et al. | |
| 7,382,733 B2 | 6/2008 | Banerjee et al. | |
| 7,484,021 B2 | 1/2009 | Rastogi et al. | |
| 7,500,023 B2 * | 3/2009 | Casper et al. | 710/5 |
| 7,500,030 B2 | 3/2009 | Hathorn et al. | |
| 7,502,873 B2 * | 3/2009 | Casper et al. | 710/5 |
| 7,539,777 B1 | 5/2009 | Aitken | |
| 7,555,554 B2 | 6/2009 | Manders et al. | |
| 7,564,791 B2 | 7/2009 | Jayakrishnan et al. | |
| 7,599,360 B2 | 10/2009 | Edsall et al. | |
| 7,711,871 B1 | 5/2010 | Haechten et al. | |
| 2001/0030943 A1 | 10/2001 | Gregg et al. | |
| 2002/0062407 A1 | 5/2002 | Tateyama et al. | |
| 2002/0099967 A1 | 7/2002 | Kawaguchi | |
| 2002/0152338 A1 * | 10/2002 | Elliott et al. | 710/34 |
| 2002/0178404 A1 | 11/2002 | Austen et al. | |
| 2003/0084213 A1 | 5/2003 | Brice, Jr. et al. | |
| 2003/0158998 A1 * | 8/2003 | Smith | 711/112 |
| 2003/0188053 A1 | 10/2003 | Tsai | |
| 2004/0054776 A1 | 3/2004 | Klotz et al. | |
| 2004/0113772 A1 | 6/2004 | Hong Chou | |
| 2004/0136241 A1 | 7/2004 | Rapp et al. | |
| 2004/0151160 A1 | 8/2004 | Sanders et al. | |
| 2004/0193968 A1 | 9/2004 | Dugan et al. | |
| 2004/0210719 A1 | 10/2004 | Bushey et al. | |
| 2004/0260851 A1 | 12/2004 | Tu | |
| 2005/0018673 A1 | 1/2005 | Dropps et al. | |
| 2005/0102456 A1 | 5/2005 | Kang | |
| 2005/0105456 A1 | 5/2005 | Cookson et al. | |
| 2005/0108251 A1 | 5/2005 | Hunt | |
| 2005/0175341 A1 | 8/2005 | Ovadia | |
| 2005/0204069 A1 | 9/2005 | Carlson et al. | |
| 2005/0223291 A1 | 10/2005 | Zimmer et al. | |
| 2005/0257118 A1 | 11/2005 | Shien | |
| 2006/0036769 A1 | 2/2006 | Frey et al. | |
| 2006/0050726 A1 | 3/2006 | Ahmed et al. | |
| 2006/0085595 A1 | 4/2006 | Slater | |
| 2006/0159112 A1 | 7/2006 | Sundaram et al. | |
| 2006/0224795 A1 | 10/2006 | Muto et al. | |
| 2007/0016554 A1 | 1/2007 | Dapp et al. | |
| 2007/0061463 A1 | 3/2007 | Hiramatsu et al. | |
| 2007/1007254 | 3/2007 | Paila et al. | |
| 2007/0079051 A1 | 4/2007 | Tanaka et al. | |
| 2007/0174544 A1 * | 7/2007 | Yasuda et al. | 711/112 |
| 2007/0239944 A1 | 10/2007 | Rupanagunta et al. | |
| 2007/0294697 A1 | 12/2007 | Theimer et al. | |
| 2008/0040519 A1 | 2/2008 | Starr et al. | |
| 2008/0147890 A1 | 6/2008 | Casper et al. | |
| 2008/0183877 A1 | 7/2008 | Carlson et al. | |
| 2008/0235553 A1 * | 9/2008 | Chintada et al. | 714/749 |
| 2008/0256264 A1 * | 10/2008 | Muto et al. | 710/5 |
| 2008/0273518 A1 * | 11/2008 | Pratt et al. | 370/345 |
| 2009/0055585 A1 | 2/2009 | Fernandes et al. | |
| 2009/0144586 A1 | 6/2009 | Casper et al. | |
| 2009/0172203 A1 | 7/2009 | Casper et al. | |
| 2009/0210557 A1 | 8/2009 | Gainey, Jr. et al. | |
| 2009/0210560 A1 | 8/2009 | Yudenfriend et al. | |
| 2009/0210561 A1 | 8/2009 | Ricci et al. | |
| 2009/0210562 A1 | 8/2009 | Huang et al. | |
| 2009/0210563 A1 | 8/2009 | Flanagan et al. | |
| 2009/0210564 A1 | 8/2009 | Ricci et al. | |
| 2009/0210570 A1 | 8/2009 | Bendyk et al. | |
| 2009/0210571 A1 | 8/2009 | Casper et al. | |
| 2009/0210572 A1 | 8/2009 | Yudenfriend et al. | |
| 2009/0210573 A1 | 8/2009 | Yudenfriend et al. | |
| 2009/0210576 A1 | 8/2009 | Casper et al. | |
| 2009/0210579 A1 | 8/2009 | Bendyk et al. | |
| 2009/0210580 A1 | 8/2009 | Bendyk et al. | |
| 2009/0210581 A1 | 8/2009 | Flanagan et al. | |
| 2009/0210582 A1 | 8/2009 | Bendyk et al. | |
| 2009/0210583 A1 | 8/2009 | Bendyk et al. | |
| 2009/0210584 A1 | 8/2009 | Carlson et al. | |
| 2009/0210585 A1 | 8/2009 | Ricci et al. | |
| 2009/0210768 A1 | 8/2009 | Carlson et al. | |
| 2009/0210769 A1 | 8/2009 | Casper et al. | |
| 2009/0210884 A1 | 8/2009 | Ricci et al. | |

FOREIGN PATENT DOCUMENTS

| | | |
|---|---|---|
| GB | 1264096 | 2/1972 |
| GB | 2291990 | 2/1996 |
| JP | 63236152 | 10/1988 |
| WO | WO2006102664 A2 | 9/2006 |

OTHER PUBLICATIONS

Casper, et al.; U.S. Appl. No. 11/548,060; "Facilitating Input/Output Processing By Using Transport Control Words To Reduce Input/Output Communications"; filed Oct. 16, 2006; Specification having 32 pages and Drawings having 12 sheets.

Casper, et al.; U.S. Appl. No. 11/548,093; "Facilitating Access To Status And Measurement Data Associated With Input/Output Processing"; filed Oct. 16, 2006; Specification having 33 pages and Drawings having 12 sheets.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing On Serial I/O Channels"; IBM Technical Disclosure Bulletin; vol. 32; No. 10A; Mar. 1990; pp. 39-40.

Golasky, Richard; "Link-Level Error Recovery With Tape Backup"; Dell Power Solutions; Aug. 2005; pp. 88-91.

"IBM® z/Architecture Principles of Operation", Publication No. SA22-7832-05, 6th Edition, Apr. 2007. 1,215 pages separated into 4 electronic attachments.

Peterson, David; "Information Technology, Fibre Channel Protocol for SCSI, Fourth Version (FCP-3)", Draft Proposed American National Standard, Jun. 2004; pp. 1-142.

Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.

Snively, et al.; "Fibre Channel, Framing and Signaling"; (FC-FS) Rev. 1.70; NCITS Working Draft Proposed American National Standard for Information Technology; Feb. 2002; pp. i-575.

Written Opinion and International Search Report for PCT/EP2009/051445 dated Jun. 25, 2009.

Written Opinion and International Search Report for PCT/EP2009/051446 dated Jun. 25, 2009.

Written Opinion and International Search Report for PCT/EP2009/051462 dated Jul. 1, 2009.

Written Opinion and International Search Report for PCT/EP2009/051450 dated Jul. 7, 2009.

Written Opinion and International Search Report for PCT/EP2009/051459 dated Jun. 23, 2009.

Written Opinion and International Search Report for PCT/EP2009/051463 dated Jul. 22, 2009.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.

Iren, et al.; "The Transport Layer: Tutorial and Survey"; ACM Computing Surveys; vol. 31, No. 4; Dec. 1999; pp. 360-405.

International Search Report and Written Opinion for PCT/EP2009/051447 dated Jul. 1, 2009.

International Search Report and Written Opinion for PCT/EP2009/051483 dated Jul. 27, 2009.

Nordstrom.; "Sequence Reception Method for a Fibre Channel Protocol Chip"; IBM Technical Disclosure Bulletin; vol. 38, No. 12; Dec. 1995; pp. 267-269.

U.S. Appl. No. 11/548,060 Non-Final Office Action dated Apr. 15, 2008.

U.S. Appl. No. 11/548,093 Non-Final Office Action dated Apr. 17, 2008.

"Protocol for Insochronous Traffic Over Fiber Channel Switching"; IBM Technical Disclosure Bulletin; vol. 37, No. 06B; Jun. 1994. pp. 377-380.

Sachs, M.W.; "I/O Marker Changing"; IBM Technical Disclosure Bulletin; vol. 37, No. 02A; Feb. 1994; pp. 75-76.

Simmons et al.; "A Performance Comparison Of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.

Srikrishnan et al.; "Sharing FCP Adapters Through Virtualization"; IBM J. Res. & Dev., vol. 51, No. 1/2; Jan./Mar. 2007; pp. 103-118.

Stone, et al.; "When The CRC and TCP Checksum Disagree"; SIGCOMM '00, Stockholm, Sweden; Jul. 2000; 10 pages.

U.S. Appl. No. 12/183,315, filed Jul. 31, 2008.

U.S. Appl. No. 12/183,323, filed Jul. 31, 2008.

U.S. Appl. No. 12/183,305, filed Jul. 31, 2008.

"z/Architecture-Principles of Operation," IBM Publication No. SA22-7832-04, 5th Ed., Sep. 2005.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,954 Non-Final Office Action dated Jan. 21, 2010.

Written Opinion and International Search Report for PCT/EP2009/051461 dated Sep. 22, 2009.

U.S. Appl. No. 12/031,182 Non-Final Office Action dated Jan. 22, 2010.

U.S. Appl. No. 12/031,201 Non-Final Office Action dated Jan. 25, 2010.

International Search Report; International Application No. PCT/EP2009/059184; International Filing Date: Jul. 16, 2009; Date of mailing: Jan. 14, 2010; 9 pages.

U.S. Appl. No. 12/030,967 Restriction Requirement Mailed Dec. 29, 2009.

ANSI INCITS 433-2007, Information Technology Fibre Channel Link Services (FC-LS), Jul. 2007.

Fibre Channel Single Byte Command Code Sets-2 Mapping Protocol (FC-SB-3), T11/Project 1357-D/Rev 1.6, INCITS Mar. 2003.

U.S. Appl. No. 12/030,951 Non-Final Office Action dated May 20, 2010.

US Appl. No. 12/031,038, Non-Final Office Action Mailed Apr. 15, 2010.

U.S. Appl. No. 12/030,975. Final Office Action Mailed May 13, 2010.

U.S. Appl. No. 12/030,967, Notice of Allowance mailed Apr. 23, 2010.

U.S. Appl. No. 12/030,985, Non Final Office Action Mailed May 5, 2010.

U.S. Appl. No. 12/031,042, Non-Final Office Action Mailed Apr. 5, 2010.

U.S. Appl. No. 12/031,021, Notice of Allowance Mailed Apr. 30, 2010.

U.S. Appl. No. 12/183,305, Non-Final Office Action Mailed May 11, 2010.

U.S. Appl. No. 12/183,315 Notice of Allowance dated Jun. 15, 2010.

U.S. Appl. No. 12/030,989 Final Office Action dated May 24, 2010.

SCSI Primary Commands -4 (SPC-4); Project T10/1731-D, Rev 11. INCITS Apr. 14, 2010.

U.S. Appl. No. 12/031,021, Notice of Allowance Mailed Jul. 8, 2010.

U.S. Appl. No. 12/030,954 Non Final Office Action mailed Jul. 12, 2010.

U.S. Appl. No. 12/030,961 Final Office Action mailed Jul. 12, 2010.

U.S. Appl. No. 12/030,993 Non Final Office Action mailed Jun. 28, 2010.

U.S. Appl. No. 12/031,021 Notice of Allowance mailed Jul. 8, 2010.

U.S. Appl. No. 12/392,246 Notice of Allowance mailed Jul. 15, 2010.

U.S. Appl. No. 12/183,323 Non Final Office Action mailed Jul. 19, 2010.

* cited by examiner

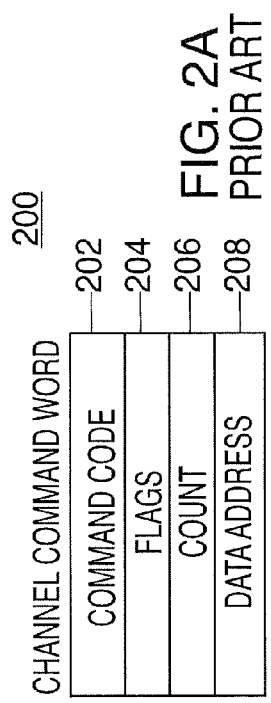
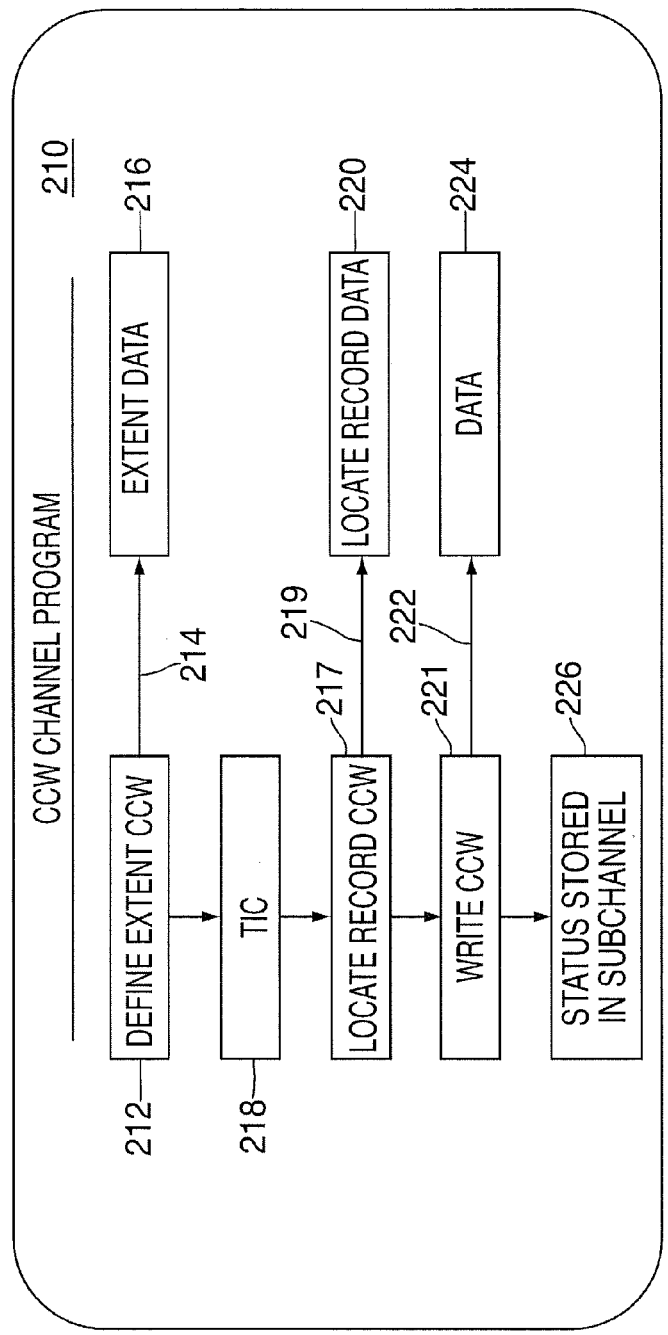

PROCESSING A VARIABLE LENGTH DEVICE COMMAND WORD AT A CONTROL UNIT IN AN I/O PROCESSING SYSTEM

BACKGROUND OF THE INVENTION

1. Field of Invention

The present disclosure relates generally to input/output (I/O) processing, and in particular, to processing a variable length device command word at a control unit in an I/O processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the I/O command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. Simplifying the role of channels in communication may include grouping multiple commands into a single I/O operation.

Some commands require both control data and customer data. Currently, a single command word (e.g., a CCW) cannot transfer both control data and customer data. A command that includes both control data and the customer data requires multiple transfers to specify both the control and customer data. This impacts the increase in throughput that can be gained by grouping commands. Performance may be improved by providing the ability for a single command word to transfer both control data and customer data.

BRIEF SUMMARY OF THE INVENTION

An exemplary embodiment includes a computer program product for processing a variable length device command word (DCW) at a control unit configured for communication with an input/output (I/O) subsystem in an I/O processing system. The computer program product includes a tangible storage medium readable by a processing circuit and storing instructions for execution by the processing circuit for performing a method. The method includes receiving a DCW at the control unit from the I/O subsystem. The DCW specifies one or more I/O operations and includes a command, a control data count, and control data having a varying length specified by the control data count. The control data is extracted in response to the control data count. The command is then executed in response to the extracted control data to perform the specified one or more I/O operations.

Another exemplary embodiment includes an apparatus for processing a variable length DCW in an I/O processing system. The apparatus includes a control unit configured for communication with an I/O subsystem. The control unit performs a method that includes receiving a DCW at the control unit from the I/O subsystem. The DCW specifies one or more I/O operations and includes a command, a control data count, and control data having a varying length specified by the control data count. The control data is extracted in response to the control data count. The command is then executed in response to the extracted control data to perform the specified one or more I/O operations.

A further exemplary embodiment includes a method for processing a variable length DCW at a control unit configured for communication with an input/output (I/O) subsystem in an I/O processing system. The method comprises receiving a DCW at the control unit from the I/O subsystem. The DCW specifies one or more I/O operations and includes a command, a control data count, and control data having a varying length specified by the control data count. The control data is extracted in response to the control data count. The command is then executed in response to the extracted control data to perform the specified one or more I/O operations.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2A depicts one example of a prior art channel command word;

FIG. 2B depicts one example of a prior art channel command word channel program;

Figure 1:
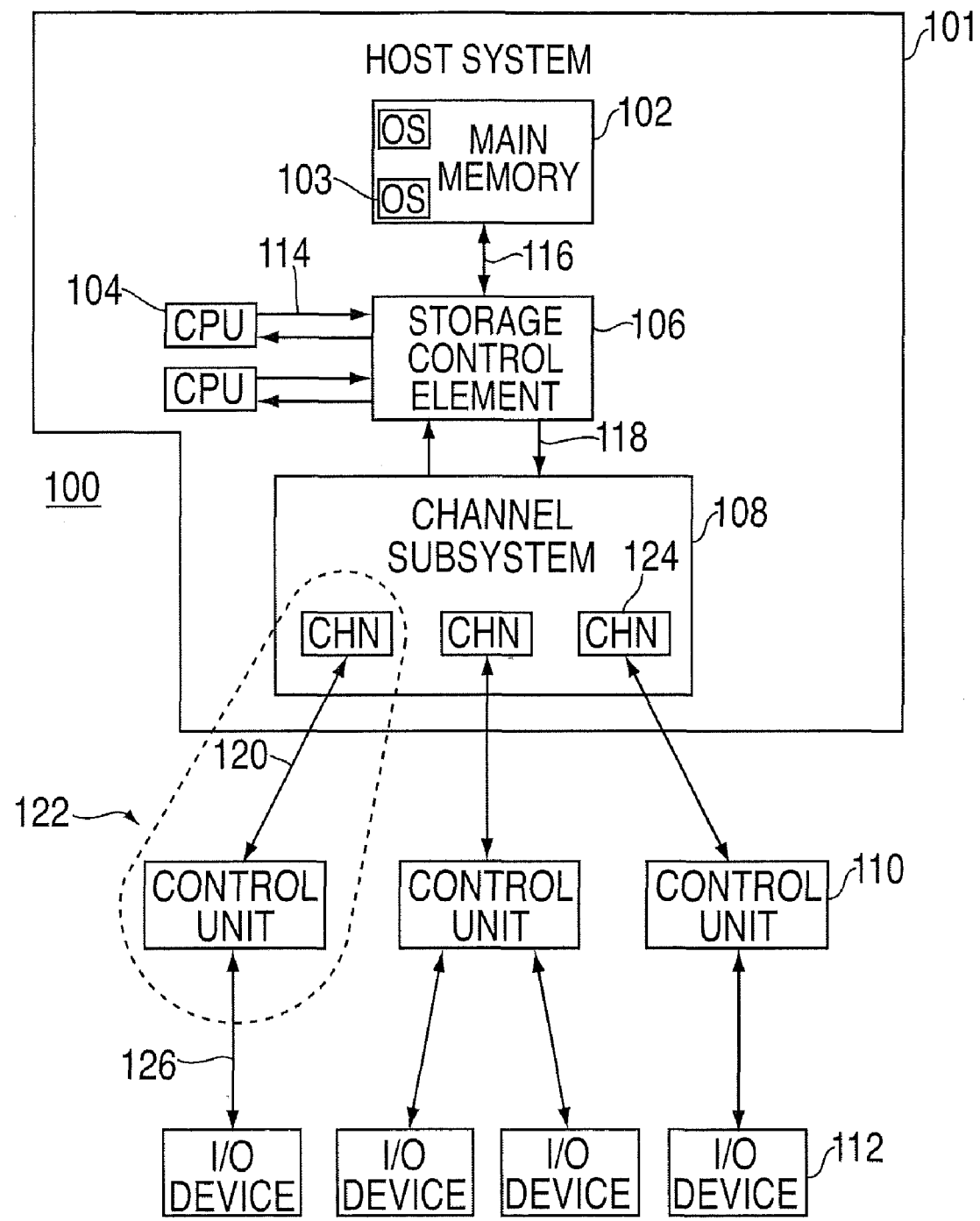
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) is facilitated by allowing a single command word to include control data and also to transfer customer data. A one byte count field is added to the command word to define the byte count of the control data required by the command. Thus, the command word includes two count fields, one for the control data and the other for customer data. In an exemplary embodiment, the variable length control data directly follows the command word.

This facilitates I/O processing by reducing communications between components of an I/O processing system used to perform the I/O processing. For instance, the number of exchanges and sequences between an I/O communications adapter, such as a channel, and a control unit is reduced. This is accomplished by sending both control and customer data to the control unit as a single entity (e.g., as part of the same control word) for execution by the control unit.

The plurality of commands (e.g., device command words or "DCWs") are included in a block, referred to herein as a transport command control block (TCCB), an address (indirect or direct) of which is specified in a transport control word (TCW). In an exemplary embodiment, the TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric (e.g., a fibre channel network). Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cornier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more write CCWs 221. Each write CCW 221 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

Figure 3:
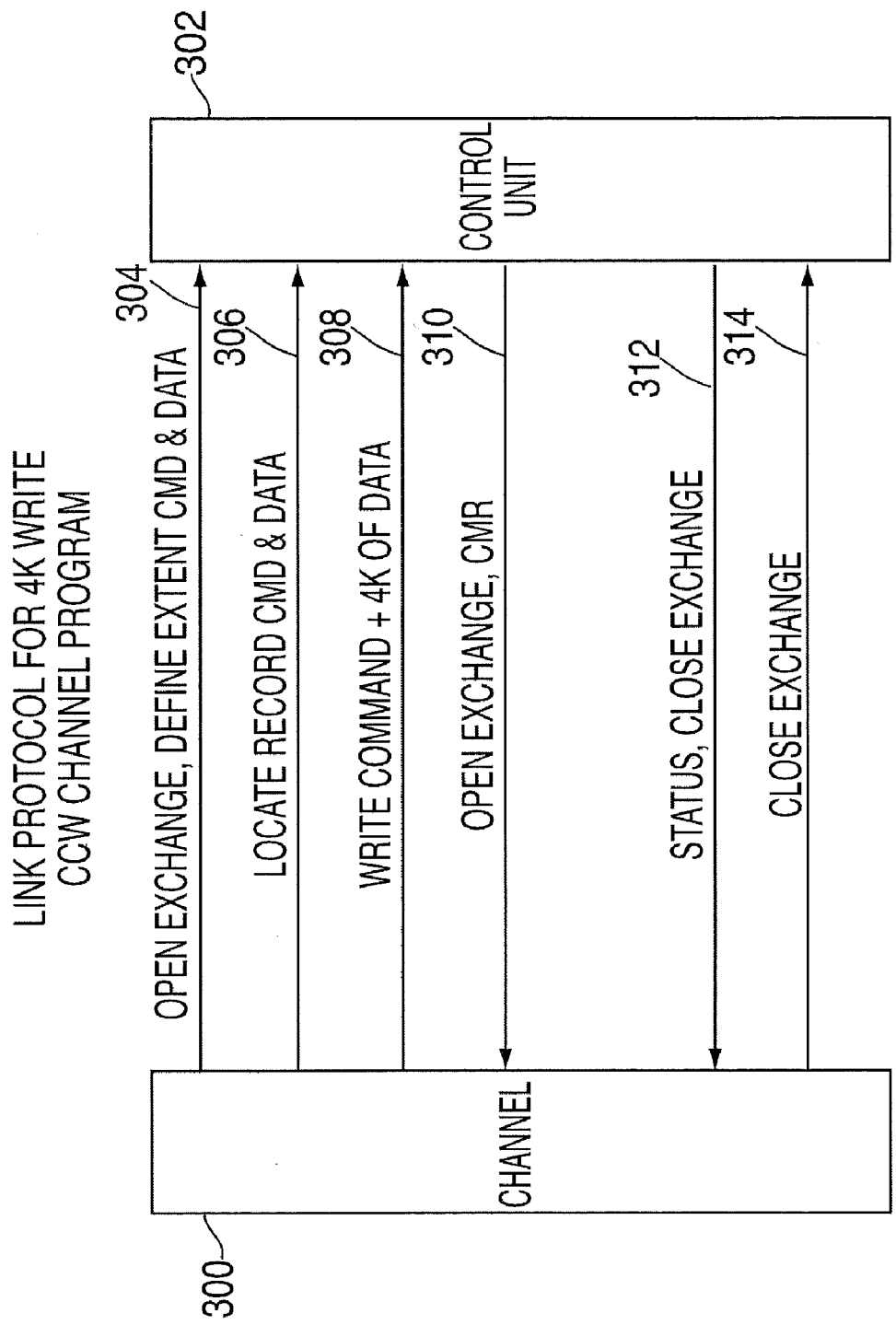
FIG. 3 depicts one embodiment of a prior art link protocol used in communicating between a channel and control unit to execute the channel command word channel program of FIG. 2B.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the write CCW. It fetches the locate record command and data 306 (FIG. 3) from the locate record CCW 217 (FIG. 2B) and locate record data 220. The write command and data 308 (FIG. 3) is fetched from write CCW 221 and data area 224 (FIG. 2B). Each is sent to the control unit 302.

The control unit 302 opens an exchange 310 with the channel 300, in response to the open exchange of the channel 300. This can occur before or after locate command and data 306 and/or write command and data 308. Along with the open exchange, a response (CMR) is forwarded to the channel 300. The CMR provides an indication to the channel 300 that the control unit 302 is active and operating.

The control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to write 4 k of data requires two exchanges to be opened and closed and six sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to write 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transport mode indirect data address words (TIDAWs), similar to MIDAWs) that points to data area 406, and a status area 408. TIDAW zero 412, TIDAW one 414 and TIDAW two 416 (collectively TIDAWs 412-416) can reference different locations in the data area 406 for acquiring or storing data. The TIDAWs 412-416 can reference non-contiguous blocks of data or contiguous blocks of data. The TIDAWs 412-416 in TIDAL 410 may be located sequentially in memory or located non-contiguously relative to each other. While only three TIDAWs 412-416 are depicted in TIDAL 410, it will be understood that any number of TIDAWs can be included in the TIDAL 410.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
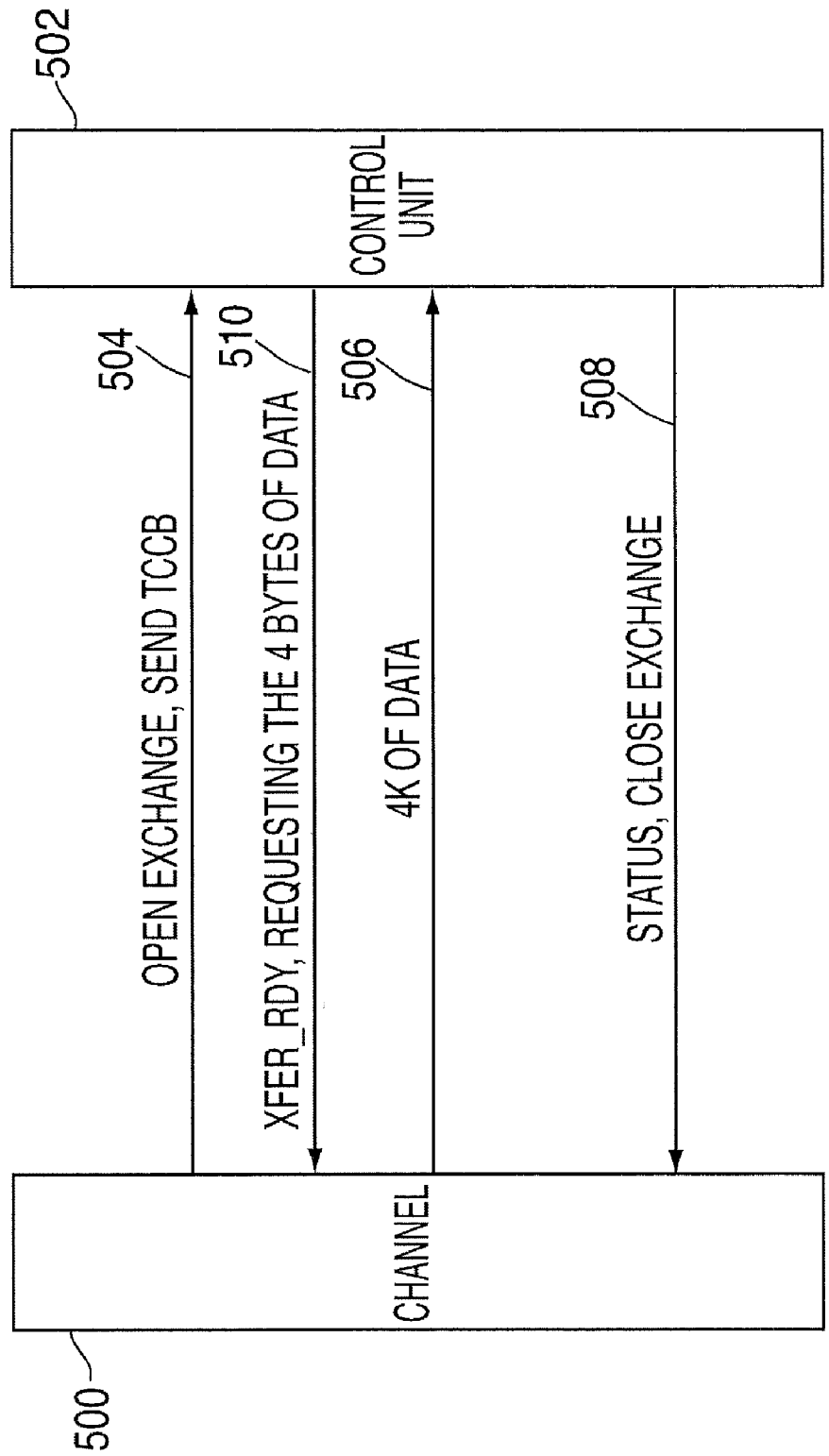
FIG. 5 depicts one embodiment of a link protocol used to communicate between a channel and control unit, with XFER_RDY not disabled, to execute the TCW channel program of FIG. 4, in accordance with an aspect of the present invention.

The embodiment of the link protocol depicted in FIG. 5 is utilized when XFER_RDY is enabled. In the embodiment depicted in FIG. 5, the channel 500 cannot send the data 506 to the control unit 502 until it is requested by the control unit 502 via the XFER_RDY IU 510. In an alternate exemplary embodiment, XFER_RDY is disabled and the control unit does not transmit a XFER_RDY IU 510 to the channel 500. Thus, the channel 500 does not have to wait for the control unit 502 to request the data 506 before sending the data 506. This alternate embodiment, where XFER_RDY is disabled may be utilized when the channel 500 and the control unit 502 are located geographically far apart from each other (e.g., greater than twenty kilometers, greater than fifty kilometers) to improve performance. Unless otherwise specified, the discussion herein assumes that XFER_RDY is enabled.

In a further example, to write 4K of customer data, the channel 500 uses the FCP link protocol phases, as follows:
1. Transfer a TCCB in the FCP_CMND IU and sequence initiative to the control unit 502.
2. Wait for a XFER_RDY IU indication that the control unit is ready to receive the data 502.
3. Transfer the IU of data, and sequence initiative to the control unit 502.
4. Final status is sent in a FCP status frame that has a bit active in, for instance, byte 10 or 11 of the FCP_RSP IU Payload. The FCP_RSP_INFO field or sense field is used to transport FICON ending status along with additional status information.

Figure 4:
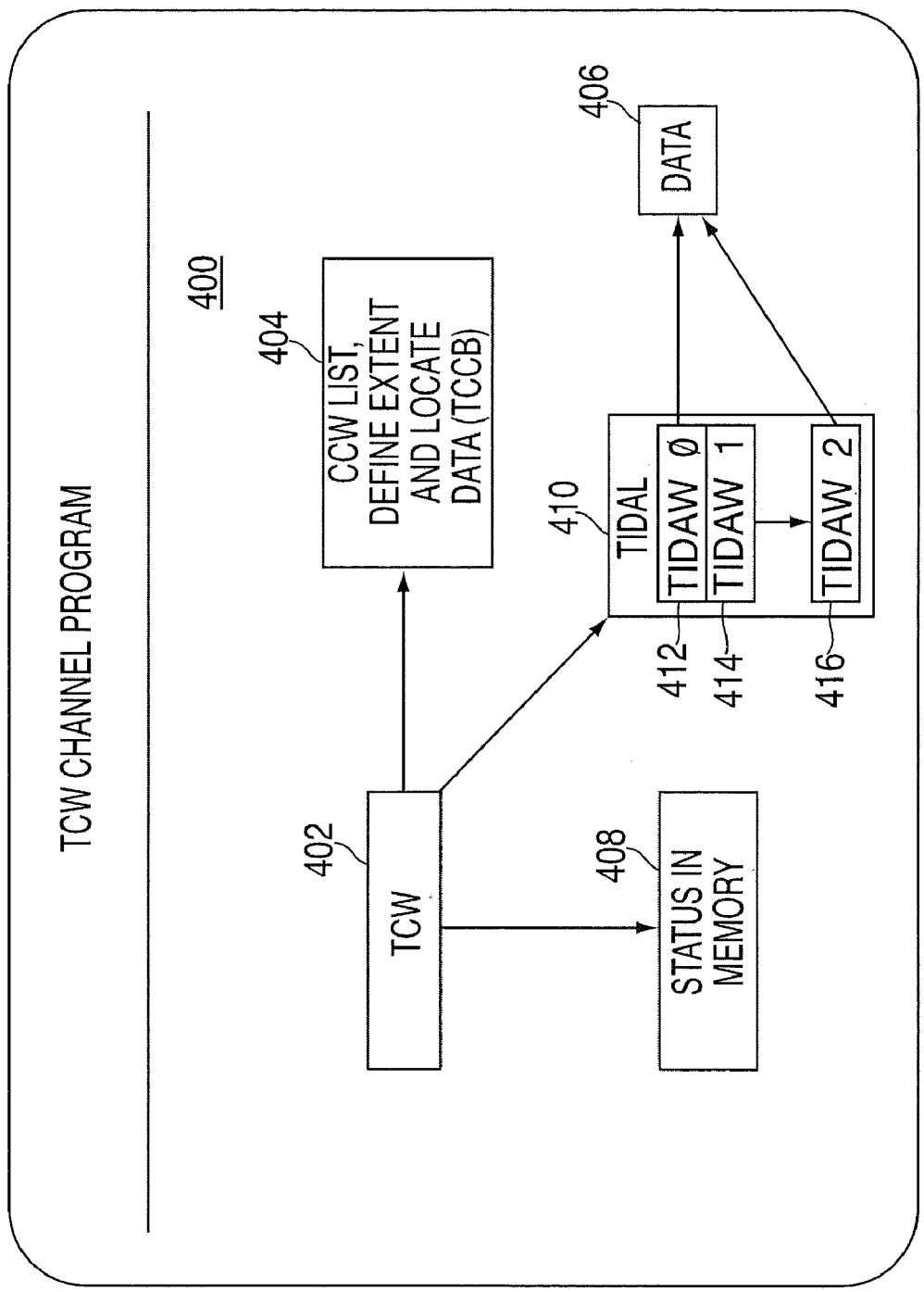
FIG. 4 depicts one embodiment of a transport control word (TCW) channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are four communication sequences (see FIGS. 4-5), as compared to six sequences for the CCW channel program (see FIGS. 2B-3).

Figure 6:
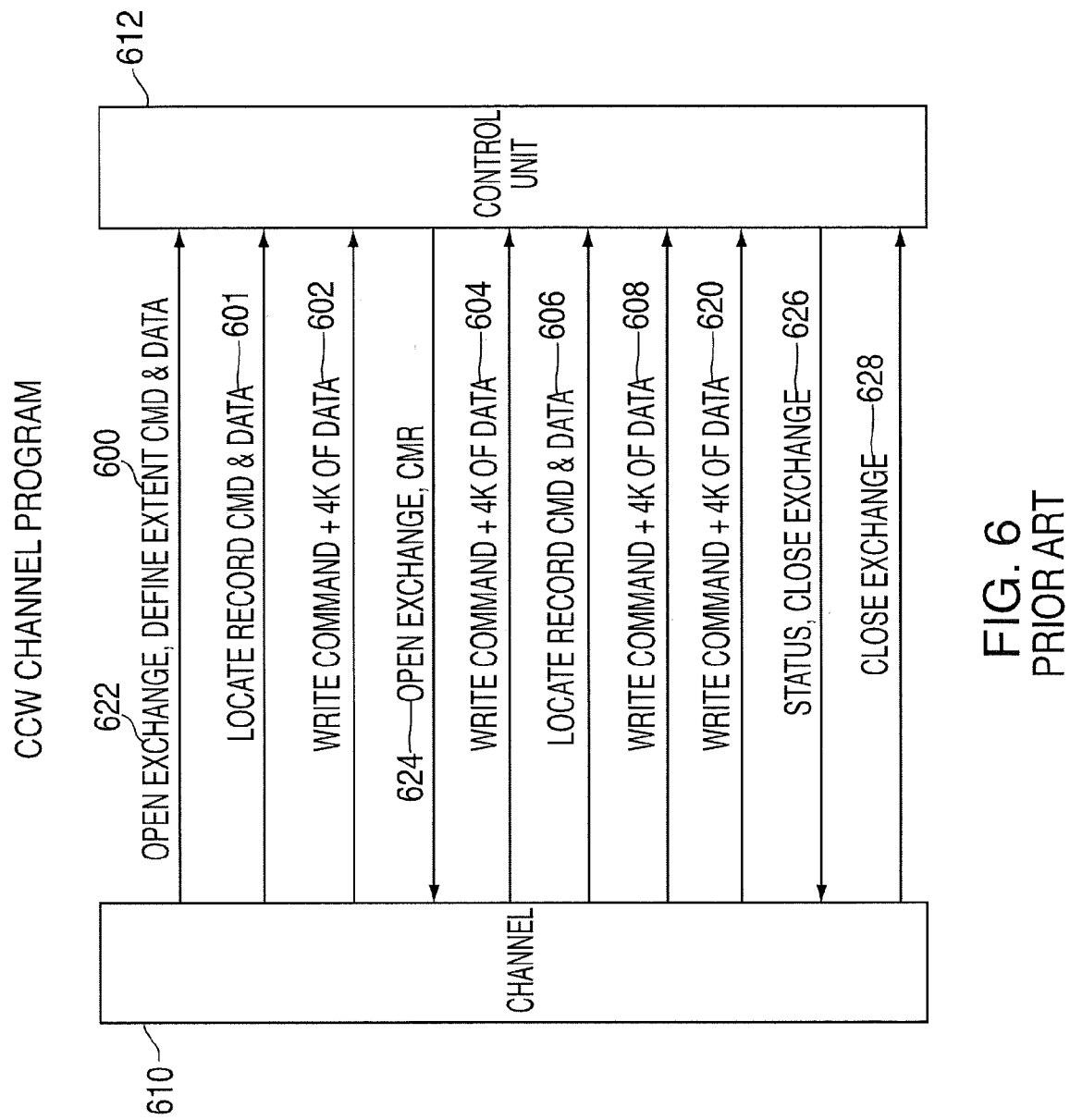
FIG. 6 depicts one embodiment of a prior art link protocol used to communicate between a channel and control unit in order to execute four write commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command and data 600, locate record command and data 601, write command and data 602, write command and data 604, locate record command and data 606, write command and data 608, and write command and data 620) are sent in separate sequences from channel 610 to control unit 612. This CCW channel program requires two exchanges to be opened and closed (e.g., open exchanges 622, 624 and close exchanges 626, 628), and ten communications sequences. This is compared to the four sequences and one exchange for the TCW channel program of FIG. 7, which accomplishes the same task as the CCW channel program of FIG. 6.

Figure 7:
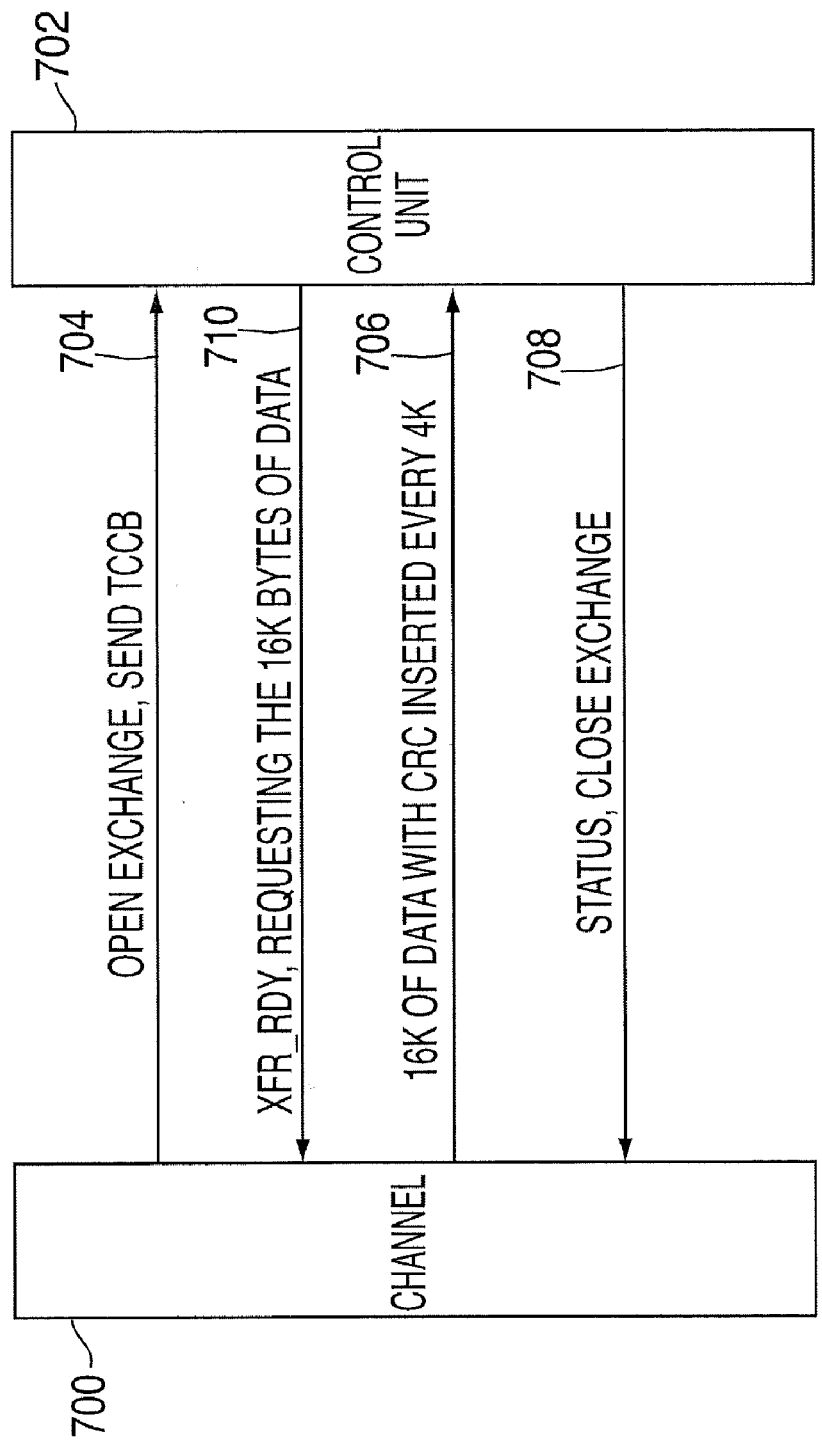
FIG. 7 depicts one embodiment of a link protocol used to communicate between a channel and control unit, with XFER_RDY not disabled, to process the four write commands of a TCW channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four write commands in DCWs, as described above. The channel 700 transmits 16 k of data 706 to the control unit 702 in a single sequence upon receipt of the XFER_RDY IU 710. The channel 700 may insert a CRC every 4K of the 16 k of data 706 in the sequence. The insertion of a CRC every 4K allows the control unit 702 to verify the 16K of data incrementally, rather than buffer the entire 16K for verification before completing the write commands in the TCCB 704. Additionally, the control unit 702 provides status to the channel 700 and closes the exchange 708. Thus, the TCW channel program of FIG. 7 requires much less communications to transfer the same amount of data as the CCW channel program of FIG. 6, while supporting incremental data verification via multiple CRC insertion in the output data stream from the channel 700.

Figure 8:
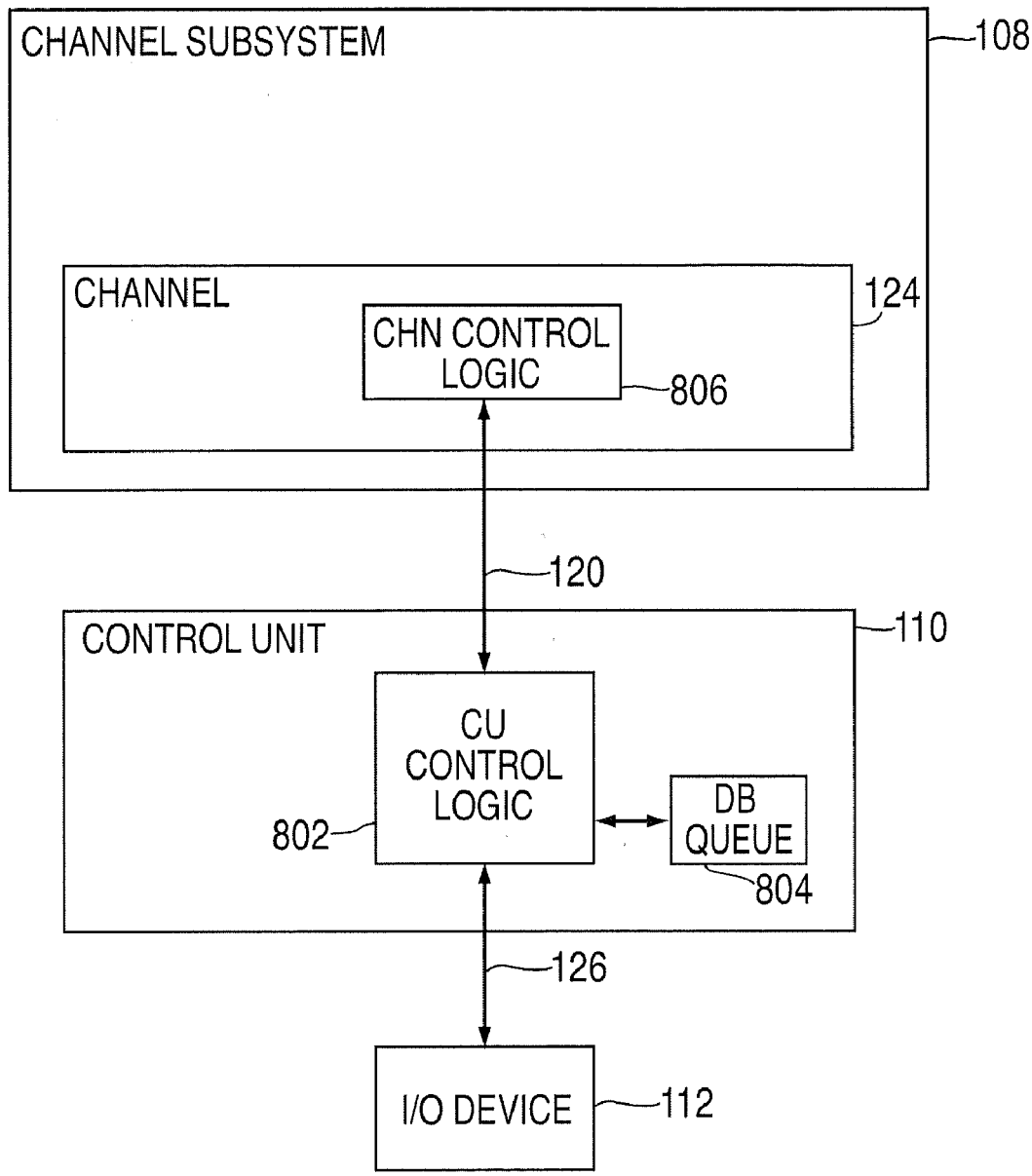
FIG. 8 depicts one embodiment of a control unit and a channel subsystem, in accordance with an aspect of the present invention.

Turning now to FIG. 8, one embodiment of channel 124 in the channel subsystem and the control unit 110 FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112 and receives status information and other feedback from the I/O device 112. For example, the I/O device 112 may be busy because of a previous reservation request targeting I/O device 112. To manage potential device reservation contention issues that can arise when the control unit 110 receives multiple requests to access the same I/O device 112, the CU control logic 802 keeps track of and stores device busy messages and associated data in a device busy queue 804. In an exemplary embodiment, an OS 103 of FIG. 1 reserves I/O device 112 to keep other OSs 103 from accessing the I/O device 112 while the reservation is active. Although device reservation is not required for all I/O operations, device reservation can be used to support operations that necessitate exclusive access for a fixed duration of time, e.g., disk formatting.

The control unit 110 may further include other buffer or memory elements (not depicted) to store multiple messages or status information associated with communications between the channel 124 and the I/O device 112. For example, a register located on the control unit 110 may include a maximum control unit exchange parameter that defines the maximum number of open control unit exchanges that the control unit 110 supports.

The channel 124 in the channel subsystem 108 includes elements to support communication with the control unit 110. In an exemplary embodiment, the CHN control logic 806 controls communication between the channel subsystem 108 and the control unit 110. The CHN control logic 806 may directly interface to the CU control logic 802 via the connection 120 to send commands and receive responses, such as transport command and response IUs. Alternatively, messaging interfaces and/or buffers (not depicted) can be placed between the CHN control logic 806 and the CU control logic 802.

Figure 9:
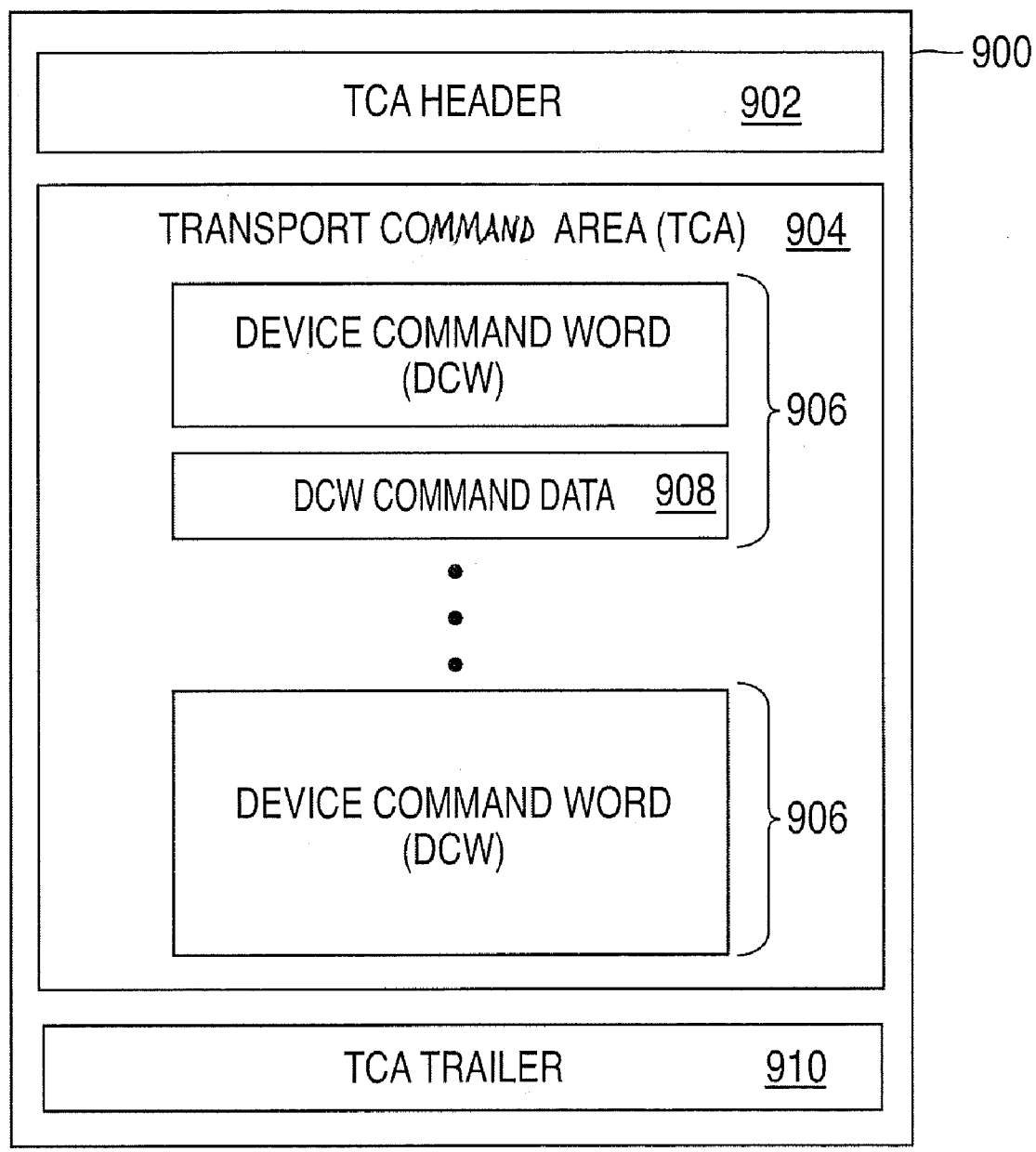
FIG. 9 depicts one embodiment of a TCCB in accordance with an aspect of the present invention.

FIG. 9 depicts one embodiment of a TCCB 900 in accordance with an aspect of the present invention. The TCCB 900 in FIG. 9 is located at the address indicated in by the TCW. This address may be a direct address or an indirect address, allowing the contents of the TCCB 900 to be in one storage location or to be spread among multiple non-contiguous storage locations. As described previously, the TCCB 900 is a control block built by software and then the channel 124 sends it to a control unit 110 (e.g., in a Transport Command IU) for execution. The TCCB 900 contains the commands to be executed by the control unit 110 and any control data required by the commands. The channel 124 does not look at the contents of the TCCB 900. The channel 124 packages the TCCB 900 and sends it to the control unit 110. This allows FCP transport protocols to be utilized instead of FICON.

The TCCB 900 includes a transport control area header (TCAH) 902 which, in an exemplary embodiment, includes information about the transport command area (TCA) 904 and operations within the TCA 904 (e.g., length, service code). The TCCB 900 depicted in FIG. 9 also includes a variable length TCA 904 which includes one or more DCWs 906 which may each include DCW control data 908. In an exemplary embodiment, the DCW control data 908 is variable length. In an exemplary embodiment, each DCW 906 includes a command flags (chaining), control data length, and read/write data length. DCW control data 908 is optional (depending on the DCW 906) and includes control parameters for the DCW 906. For example, DCW control data 908 may include define extent and/or prefix parameters. In an exemplary embodiment, the DCW control data is located at the end of the DCW 906 within the TCA 904 and is not pointed to by the DCW 906. Finally, the TCCB 900 includes a TCA trailer (TCAT) 910 that contains data such as the count of the bytes to be transferred in the TCCB 900.

Figure 10:
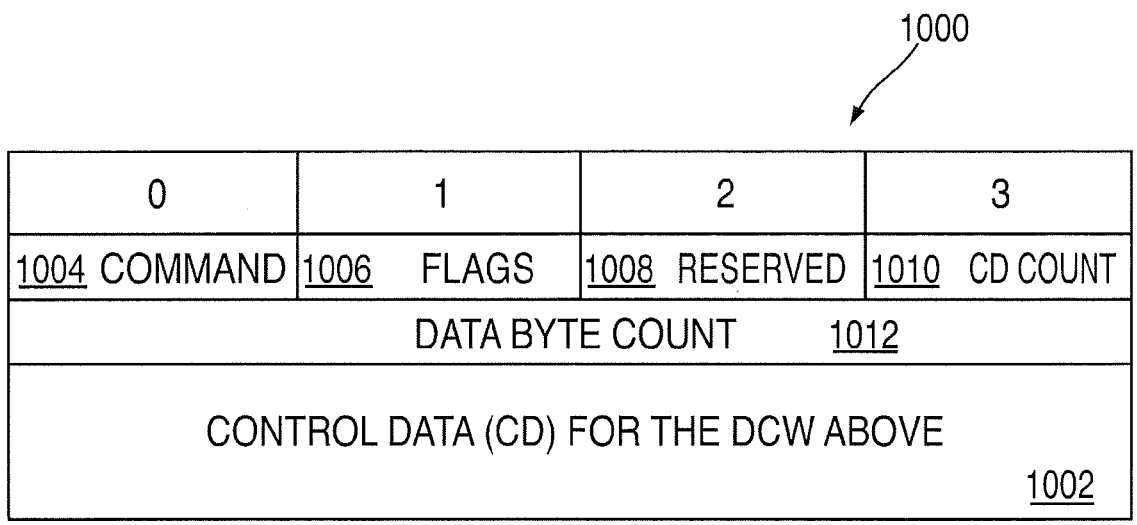
FIG. 10 depicts one embodiment of a DCW in accordance with an aspect of the present invention.

FIG. 10 depicts one embodiment of a DCW 1000 in accordance with an aspect of the present invention. In an exemplary embodiment, the DCW 1000 is eight bytes in length plus the length of the control data 1002. The DCW includes a command field 1004, a flags field 1006, a reserved field 1008, a control data (CD) count field 1010, and a data byte count field 1012. The DCW command field 1004 is one byte in length and is the same as the CCW command byte utilized in a CCW (but may include additional command codes not utilized by a CCW). The flags field 1006 includes eight bits; in an exemplary embodiment, the second bit is a chain command to the next DCW 1000 in the TCA 904. When this flag bit is set to zero, it indicates that this is the last DCW 1000 of the DCW program in the TCA 904. The other bits in the flag field 1006 are reserved and set to zero.

The CD count field 1010 is a one byte field that contains the byte count of the control data 1002 used by this DCW 1000. The control data 1002 is tacked on to the end of the DCW 1000. In an exemplary embodiment, the space used between DCWs 1000 when control data 1002 is present is the size of the control data 1002 padded up to the next four byte boundary so that the DCWs 1000 always start on a four byte boundary. The data byte count field 1012 is a four byte DCW byte count field. This is the DCW count of customer data (e.g., the data 406 in FIG. 4). In an exemplary embodiment, this count does not include padding or CRC bytes to be transferred by this DCW command. This DCW byte count field 1012 has the same meaning as the count field in a CCW, except that it can be much larger. If the DCW command is a command immediate or a no-op command (i.e., contains no customer data), then the data byte count field 1012 is equal to zero.

In an exemplary embodiment, the control data 1002 is in the same TCA 904 at the end of the DCW 1000 with which the control data 1002 is associated. In an exemplary embodiment, the control data 1002 is padded out to the next four byte boundary in the TCA 904. The CD count field 1010 reflects the number of bytes of control data 1002. In an exemplary embodiment, the maximum length of the control data 1002 in a TCA 904 is two hundred and thirty two bytes assuming one DCW 1000 and the rest of the TCA 904 is taken up by the control data for the DCW 1000.

Figure 11:
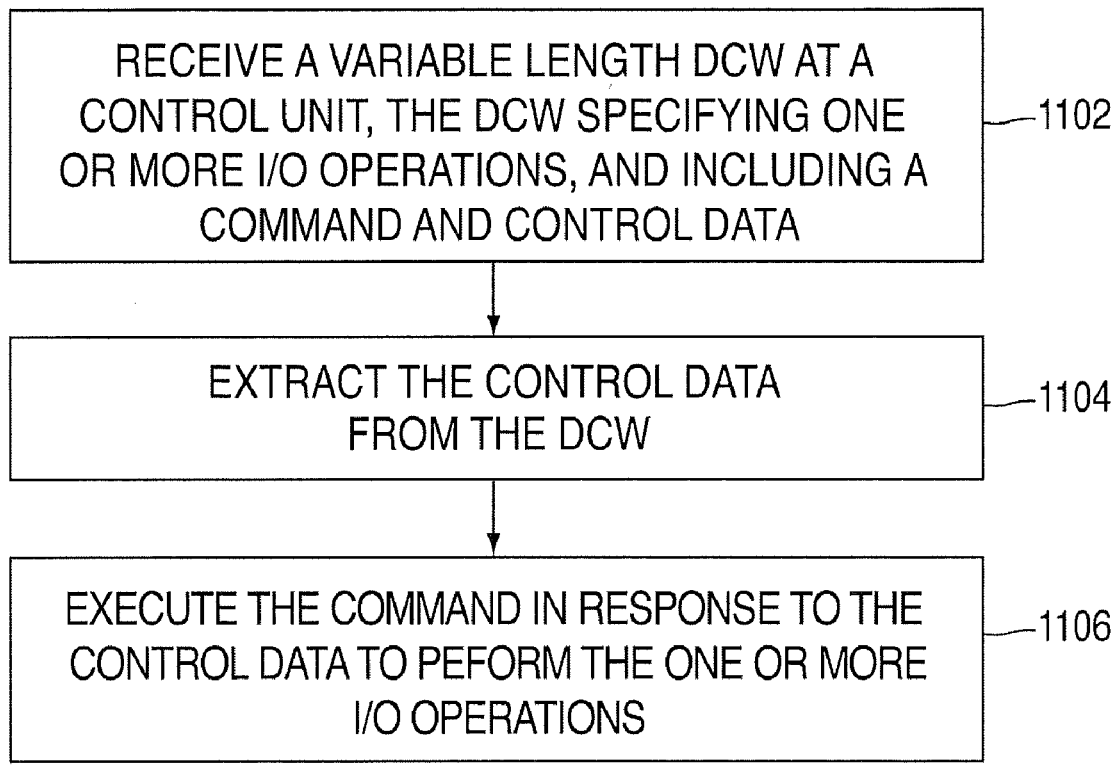
FIG. 11 depicts one embodiment of a process for providing a variable length DCW in accordance with an aspect of the present invention.

FIG. 11 depicts one embodiment of a process for providing a variable length DCW in accordance with an aspect of the present invention. At block 1102 a control unit receives a variable length DCW 1000. The DCW 1000 specifies multiple equivalent legacy I/O operations (e.g., define extent, locate record and then a read operation or a write operation, etc.) defined by command 1004, control data count 1010, and variable length control data 1002. The length of the control data is specified by the control data count. At block 1104, the control data 1002 is extracted from the DCW using the control data count to determine how many bytes at the end of the DCW 1000 are to be included in the control data. At block 1106, the command is executed by the control unit using the control data as input to the executing. The execution results in multiple equivalent legacy I/O operations being performed. If the DCW also includes customer data (e.g., the data byte count 1012 is non-zero) then the command is executed in response to the to the control data and to the customer data. In addition, the control unit may transmit a completion status of the command (e.g., completed successfully, error conditions, etc.) to the host computer system.

Thus, referring back to FIGS. 2B and 10, an exemplary embodiment of the present invention may be utilized to combine the define extent CCW 212, locate record CCW 217 and write CCW 221 into a single DCW. This DCW is a combined command that means: define extent, locate record, and write customer data. In this exemplary embodiment, the extent and locate record parameter data is the control data that is part of the DCW whose length is defined by the control data count 1010. The customer data length is controlled by the data byte count 1012. The customer data transferred can only be a write (output) or a read (input), not both, in the same DCW. This combination of commands within a CCW could not have been performed in current implementations because the only way to get the control data (the define extent parameters and the locate record parameters) to the control unit was for the channel to transfer these parameters as data to the control unit.

Technical effects of exemplary embodiments include the ability to transfer customer data and control data within the same DCW. This may lead to improved performance by requiring fewer exchanges to perform the same number of functions.

Figure 12:
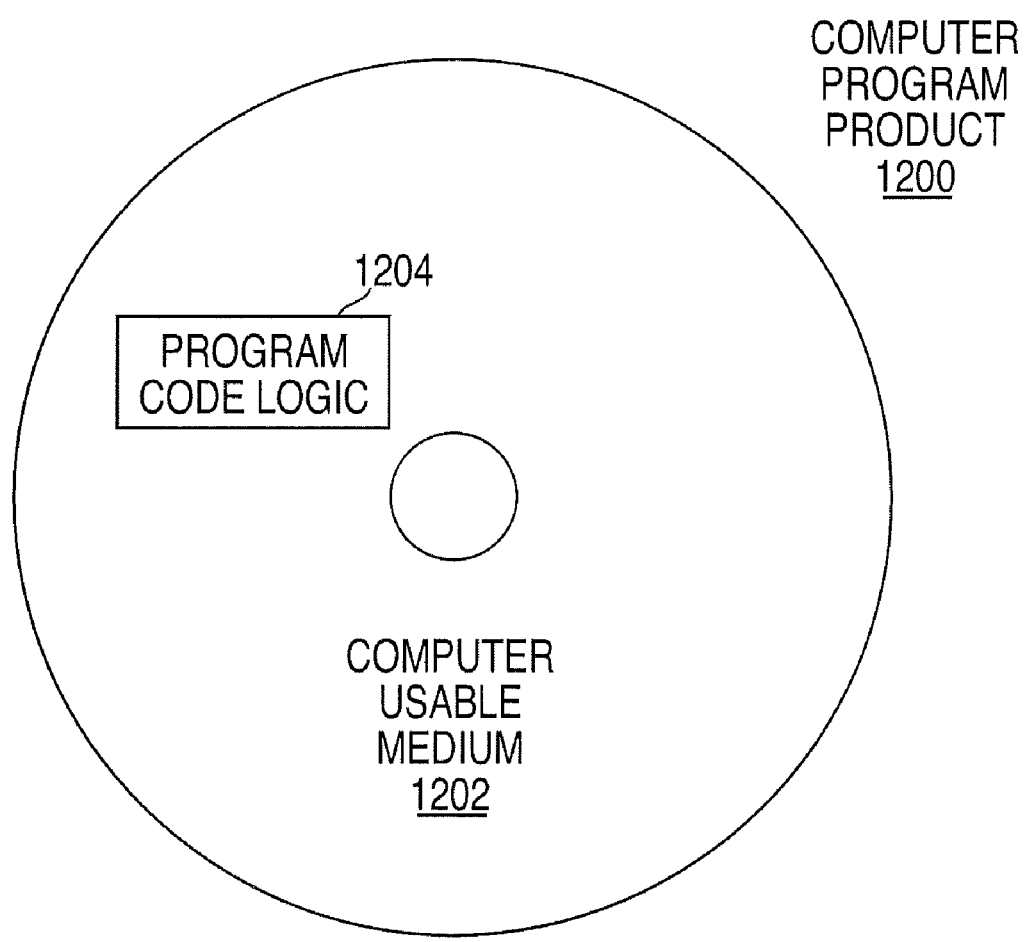
FIG. 12 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1200 as depicted in FIG. 12 on a computer usable medium 1202 with computer program code logic 1204 containing instructions embodied in tangible media as an article of manufacture. Exemplary articles of manufacture for computer usable medium 1202 may include floppy diskettes, CD-ROMs, hard drives, universal serial bus (USB) flash drives, or any other computer-readable storage medium, wherein, when the computer program code logic 1204 is loaded into and executed by a computer, the computer becomes an apparatus for practicing the invention. Embodiments include computer program code logic 1204, for example, whether stored in a storage medium, loaded into and/or executed by a computer, or transmitted over some transmission medium, such as over electrical wiring or cabling, through fiber optics, or via electromagnetic radiation, wherein, when the computer program code logic 1204 is loaded into and executed by a computer, the computer becomes an apparatus for practicing the invention. When implemented on a general-purpose microprocessor, the computer program code logic 1204 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for processing a variable length device command word (DCW) at a control unit configured for communication with an input/output (I/O) subsystem in an I/O processing system, the computer program product comprising:
    a tangible storage medium readable by a processing circuit and storing instructions for execution by the processing circuit for performing a method comprising:
        receiving a DCW at the control unit from the I/O subsystem via a transport command control block (TCCB) that includes a transport command area (TCA) header, a TCA where one or more DCWs are located, and a TCA trailer, the DCW specifying one or more I/O operations and including a command, a control data count, and control data having a varying length specified by the control data count;
        extracting the control data in response to the control data count; and
        executing the command in response to the extracted control data to perform the specified one or more I/O operations.

2. The computer program product of claim 1, wherein the DCW further includes a customer data count specifying an amount of customer data associated with the DCW.

3. The computer program product of claim 2 wherein the customer data count has a value greater than zero and the method further comprises receiving customer data from the I/O subsystem.

4. The computer program product of claim 2 wherein the customer data count has a value greater than zero and the method further comprises transmitting the customer data to the I/O subsystem.

5. The computer program product of claim 1 wherein the method further comprises completing the I/O operations and transmitting a completion message to the I/O subsystem in response to the completing.

6. The computer program product of claim 1 wherein the I/O subsystem is a channel subsystem.

7. An apparatus for processing a variable length DCW in an I/O processing system, the apparatus comprising:
    a control unit for communicating with an I/O subsystem, the control unit configured to perform a method comprising:
        receiving a DCW specifying one or more I/O operations at the control unit from the I/O subsystem via a transport command control block (TCCB) that includes a transport command area (TCA) header, a TCA where one or more DCWs are located, and a TCA trailer, the DCW including a command, a control data count, and control data having a varying length specified by the control data count;
        extracting the control data in response to the control data count; and
        executing the command in response to the extracted control data to perform the specified one or more I/O operations.

8. The apparatus of claim 7, wherein the DCW further includes a customer data count specifying an amount of customer data associated with the DCW.

9. The apparatus of claim 8 wherein the customer data count has a value greater than zero and the method further comprises receiving the customer data from the I/O subsystem.

10. The apparatus of claim 8 wherein the customer data count has a value greater than zero and the method further comprises transmitting the customer data to the I/O subsystem.

11. The apparatus of claim 7 wherein the method further comprises completing the I/O operations and transmitting a completion message to the I/O subsystem in response to completing.

12. A method for processing a variable length DCW at a control unit configured for communication with an input/output (I/O) subsystem in an I/O processing system, the method comprising:

receiving a DCW specifying one or more I/O operations at the control unit from the host computer system via a transport command control block (TCCB) that includes a transport command area (TCA) header, a TCA where one or more DCWs are located, and a TCA trailer, the DCW including a command, a control data count, and control data having a varying length specified by the control data count;

extracting the control data in response to the control data count; and executing the command in response to the extracted control data to perform the specified one or more I/O operations.

13. The method of claim 12, wherein the DCW further includes a customer data count specifying an amount of customer data associated with the DCW.

14. The method of claim 13 wherein the customer data count has a value greater than zero and the method further comprises receiving the customer data from the I/O subsystem.

15. The method of claim 13 wherein the customer data count has a value greater than zero and the method further comprises transmitting the customer data to the I/O subsystem.

16. The method of claim 12 further comprising completing the I/O operations and transmitting a completion message to the I/O subsystem in response to the completing.

* * * * *